(12) United States Patent
Avati et al.

(10) Patent No.: US 10,534,753 B2
(45) Date of Patent: Jan. 14, 2020

(54) CASELESS FILE LOOKUP IN A DISTRIBUTED FILE SYSTEM

(71) Applicant: Red Hat, Inc., Raleigh, NC (US)

(72) Inventors: Anand Avati, Mountain View, CA (US); Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 395 days.

(21) Appl. No.: 14/178,198

(22) Filed: Feb. 11, 2014

(65) Prior Publication Data
US 2015/0227535 A1 Aug. 13, 2015

(51) Int. Cl.
| | |
|---|---|
| G06F 16/00 | (2019.01) |
| G06F 16/13 | (2019.01) |
| G06F 16/11 | (2019.01) |
| G06F 16/14 | (2019.01) |
| G06F 16/16 | (2019.01) |

(52) U.S. Cl.
CPC .......... *G06F 16/137* (2019.01); *G06F 16/116* (2019.01); *G06F 16/13* (2019.01); *G06F 16/152* (2019.01); *G06F 16/166* (2019.01)

(58) Field of Classification Search
CPC ................................................ G06F 17/30097
USPC ........................................................ 707/741
See application file for complete search history.

(56) References Cited

U.S. PATENT DOCUMENTS

| | | | |
|---|---|---|---|
| 5,630,114 A | 5/1997 | Serra et al. | |
| 6,424,973 B1 * | 7/2002 | Baclawski | .......... G06F 16/9014 |
| 8,346,717 B1 | 1/2013 | Mensch et al. | |
| 9,020,977 B1 * | 4/2015 | Schouten | .......... H04L 29/08081 |
| | | | 707/796 |
| 2002/0097724 A1 * | 7/2002 | Halme | ................ H04L 67/1002 |
| | | | 370/392 |
| 2006/0173913 A1 * | 8/2006 | Aoyama | ............ H04N 1/32128 |
| 2006/0200465 A1 | 9/2006 | Chuang | |
| 2009/0144422 A1 * | 6/2009 | Chatley | ................. G06F 3/0613 |
| | | | 709/226 |
| 2011/0029672 A1 * | 2/2011 | Agneeswaran | ....... G06F 9/5044 |
| | | | 709/226 |
| 2012/0254210 A1 | 3/2012 | Dhulipala et al. | |

(Continued)

FOREIGN PATENT DOCUMENTS

CN 100405365 C 12/2004

OTHER PUBLICATIONS

"Caseless Filesystem," Published Jan. 25, 2012, https://bitbucket.org/tnmurphy/raptor/src/69a888faa68471db2a33f3a195aefb60e375db48/util/caseless/README.

(Continued)

*Primary Examiner* — Mark D Featherstone
*Assistant Examiner* — Diedra McQuitery
(74) *Attorney, Agent, or Firm* — Womble Bond Dickinson (US) LLP; Daniel E. Ovanezian

(57) ABSTRACT

A caseless file lookup in a distributed file system is disclosed. A request to store a file in a volume may be received. In response to the request, the type of client system issuing the request may be identified. Based on the type of client system that has been identified, a first hash value or a second hash value may be calculated for the name of the file to generate and assign a hash value to the file. The file may be stored in a storage resource based on the first or second hash value that has been generated for the file.

17 Claims, 6 Drawing Sheets

(56) References Cited

U.S. PATENT DOCUMENTS

2014/0089273 A1* 3/2014 Borshack ............ G06F 16/137
                                                    707/692

OTHER PUBLICATIONS

Wood, "Git Unite—Fix Case Sensitive File Paths on Windows," Published Jan. 13, 2013, http://www.woodcp.com/2013/01/git-unite-fix-case-sensitive-file-paths-on-windows/.

Erdman, "'Caseless' Search and Sort in Query," Published Jun. 2001, http://search400.techtarget.com/tip/Caseless-search-and-sort-in-query.

McBurney, "Do a Range Lookup in DataStage 8," Published Mar. 28, 2008, http://it.toolbox.com/wiki/index.php/Do_a_range_lookup_in_DataStage_8.

"Case Sensitive Server Files," Retrieved on Oct. 25, 2013, http://support.clicktracks.com/clicktracks/article.php?id=198.

"Case-sensitivity and the MVFS," Retrieved on Oct. 25, 2013, https://pic.dhe.ibm.com/infocenter/cchelp/v7r1m0/index.jsp?topic=/com.ibm.rational.clearcase.cc_admin.doc/topics/c_netadm_case_mvfs.htm.

"Identifier Case Sensitivity," Retrieved on Oct. 25, 2013, http://dev.mysql.com/doc/refman/5.1/en/identifier-case-sensitivity.html.

* cited by examiner

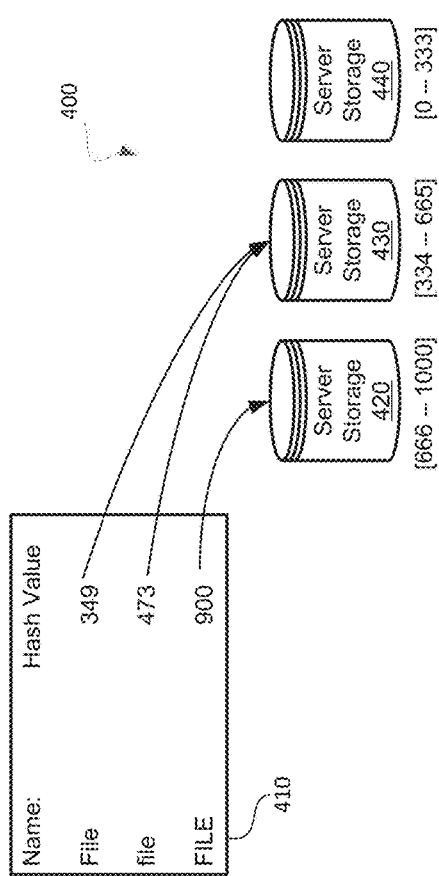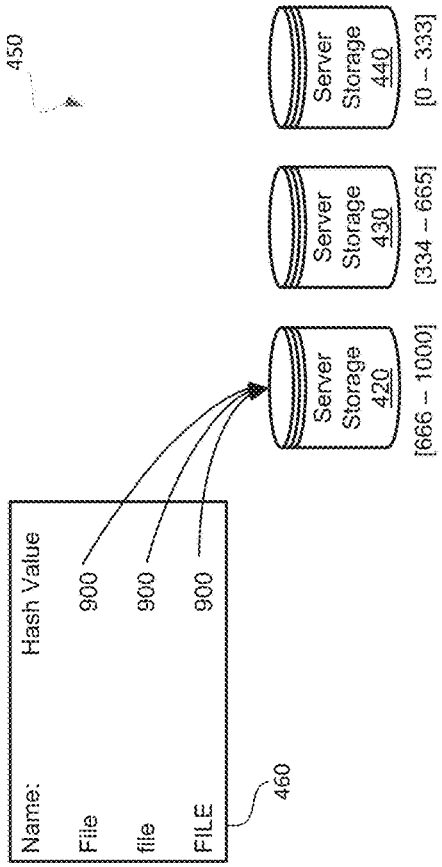

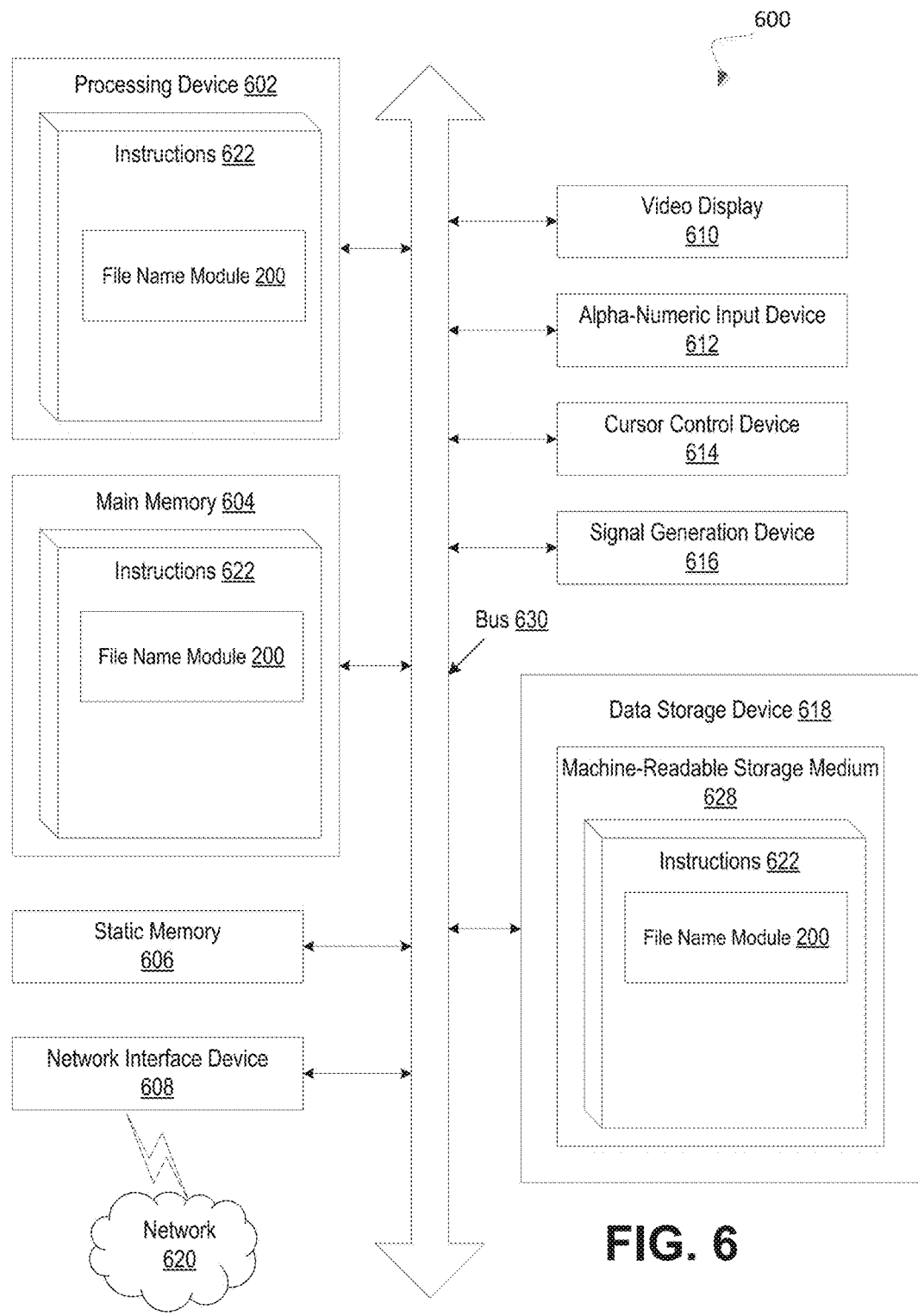

CASELESS FILE LOOKUP IN A DISTRIBUTED FILE SYSTEM

TECHNICAL FIELD

Aspects of the disclosure relate generally to distributed file systems and, more specifically, relate to caseless file lookup in a distributed file system.

BACKGROUND

Each file stored in a file system may be associated with a file name. Operating systems using the file system may exhibit various degrees of case sensitivity for the file names. Case sensitivity may refer to a combination of different uppercase and lowercase letters having a different meaning. For example, certain file names used by operating systems may be named with different combinations of uppercase and lowercase letters. As an example, a first file may have a file name of 'File' and a second file may have a file name of 'file.' In terms of case sensitivity, the two file names have different meanings as each uses a different combination of uppercase and lowercase letters.

Certain operating systems may utilize a case sensitive file name scheme to identify various files. As a result, a first file named 'File' and a second file named 'file' may be separately stored files in the file system of the case sensitive operating system. For example, the operating system may access the first file by issuing a read request for the first file name with the exact combination of uppercase and lowercase letters (e.g., 'File').

Other operating systems may utilize a case insensitive file name scheme when identifying and storing files. Case insensitivity may refer to a combination of uppercase and lowercase letters of the same word having the same meaning. As a result, only one file named 'file' using any combination of uppercase and lowercase letters may be detected or accessed by the case insensitive operating system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4A is an illustrated example of storing files in a distributed file system based on a first hash algorithm in accordance with some embodiments of the disclosure.

FIG. 4B is an illustrated example of storing files in a distributed file system based on a second hash algorithm in accordance with some embodiments of the disclosure.

FIG. 6 illustrates a block diagram of an embodiment of a computer system in which some embodiments of the disclosure may operate.

DETAILED DESCRIPTION

Figure 1:
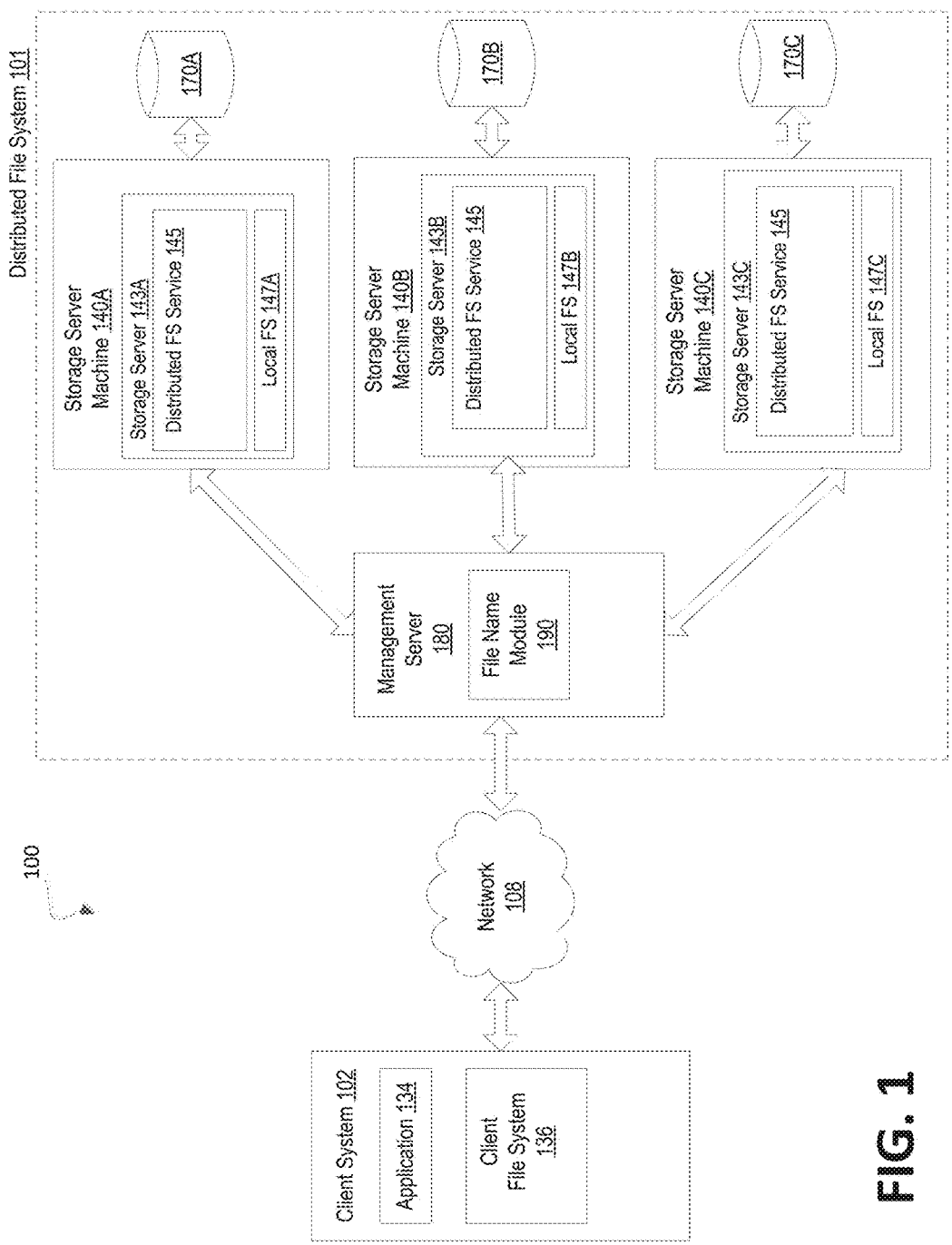
FIG. 1 illustrates an example system architecture in which embodiments of the disclosure may operate.

Embodiments of the disclosure support a caseless file lookup in a distributed file system. A distributed file system may be a type of cloud computing infrastructure or system that includes multiple servers. The servers of the distributed file system may be associated with or manage storage resource to store files.

The distributed file system may be used by multiple clients or client systems. For example, client computer systems may write or store files in the storage resources (i.e., storage devices) of the distributed file system as well as read or retrieve files in the storage resources of the distributed file system. However, the client systems that are utilizing the storage resources of the distributed file system may not be a uniform type of client system. For example, a first client system may be based on an operating system using a case sensitive file system (e.g., a UNIX™ based operating system) and a second client system may be based on an operating system using a case insensitive file system (e.g., a Windows™ based operating system).

The presence of both a case sensitive operating system and a case insensitive operating system utilizing the distributed file system may yield certain complications for a distributed file system. For example, a case insensitive operating system may store all file names in a case insensitive manner. For example, if a user of the case insensitive operating system writes or stores a file named 'FILE', the file system of the case insensitive operating system may internally store the name of the file as 'file.' As a second example, if the user writes or stores a file named 'fiLE', the file system of the case insensitive operating system may store the name of the file as 'file' as well. As such, the case insensitive operating system may format the file name regardless of how a user has named the file. For example, the case insensitive operating system may format all of the file names as all lowercase letters, all uppercase letters, or any other repeatable combination of uppercase and/or lowercase letters. Thus, in a case insensitive operating system, only one name for a file may be stored in the file system, regardless of any variation in the combination of uppercase and lowercase letters of the name.

However, as the distributed file system may also be used by case sensitive operating systems, the formatting of the file name by the case insensitive operating system may cause complications for the distributed file system when it is to write and store files for the case insensitive operating system. For example, in order to find a file requested by the case insensitive operating system, a management system of the distributed file system may need to determine whether each storage resource of each server of the distributed file system stores a file with a matching name in any case (e.g., any combination of uppercase and lowercase letters for the file). For example, a user of the case insensitive operating system may request a file named 'File' and since the case insensitive operating system formats file names, the case insensitive operating system may transmit a request for a file named 'file' (e.g., all lowercase) to the management server of the distributed file system. Each storage resource of each server may transmit a list of file names to the management server so that the management server may search the stored file names for any instance of any case (e.g., any combination of uppercase or lowercase letters) for 'file.' For example, the management server may search for 'file', 'FILE', 'fiLe', 'fILE', etc.

However, the transmitting of all of the file names to the management server may utilize a significant amount of network resources of the distributed file system. In order to more efficiently identify a particular file for a case insensitive operating system, searching for file names may be performed at the servers associated with the storage resources themselves. For example, the management server may issue a query command to each server to search for a file with the corresponding name in any case. Furthermore, a hashing mechanism may be used to transmit or issue the query command to a select subset of the servers of the distributed file system. As such, instead of querying all of the storage servers of the distributed file system, which may also require a significant amount of network resources, a subset of the storage servers of the distributed file system may be queried based on the hashing mechanism.

FIG. 1 is an example system architecture 100 for various implementations of the disclosure. The system architecture 100 may include a distributed file system 101 coupled to one or more client machines 102 via a network 108. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 may be a network attached storage file system that includes one or more storage server machines 140A, 140B, and 140C, each of which may control and manage any number of storage resources 170A, 170B, and 170C. A storage server machine 140A-C may include a network-accessible server-based functionality (e.g., storage server 143A-C) or other data processing equipment. The storage server machines 140A-C may include, but are not limited to, any data processing device, such as a desktop computer, a laptop computer, a mainframe computer, a personal digital assistant, a rack-mount server, a hand-held device or any other device configured to process data. The storage server machines 140A-C of the distributed file system 101 may be grouped into one or more clusters. A cluster may be a group of linked storage servers 143A-C working together closely.

The storage resources 170A-C may be mass storage devices, such as magnetic or optical storage based disks, solid-state drives (SSDs) or hard drives, coupled to the storage server machines 140A-B (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C may each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include, but are not limited to, EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-C may each additionally include an instance of a distributed file system (FS) service 145. The distributed FS service 145 interfaces with local file systems 147A-C to store files on the storage resources 170A-C, as well as allow retrieval of stored files to the client system 102. The distributed file system service 145 instances additionally interface with one another to form the distributed file system 101.

The distributed file system services 145, and thus the distributed file system 101, may store data as files and may include directories, also referred to as folders, which are virtual containers within the distributed file system 101, in which groups of computer files and possibly other directories may be kept and organized. The distributed file system 101 may organize data (e.g., files) in the disks 170A-C using volumes. A volume may be a single accessible storage area of the distributed file system 101 that may be resident on a single partition or directory of a hardware resource 170A-C (e.g., of a hard disk) of the file system 101. A volume may be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some embodiments, a volume of the distributed file system 101 may be associated with multiple storage resources 170A-C. Files of a volume may be stored across the storage resources 170A-C. For example, a volume label "C:" may be assigned to a partition or portion of a first storage resource 170A, a partition or portion of a second storage resource 170B, and a partition or portion of a third storage resource 170C. As such, files of a single volume may be distributed between multiple storage resources 170A-C.

Any number of client systems 102 may include a client file system 136 to communicate with the storage servers 143A-C in the distributed file system 101. The client system 102 may a computing device such as a server computer, a desktop computer, a set-top box, a gaming console, a television, a portable computing device such as, and not limited to, mobile telephones, personal digital assistants (PDAs), portable media players, netbooks, laptop computers, electronic book reader, and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 101. For example, the application 134 may request to read or write files stored in a volume associated with storage resources 170A-C.

The distributed file system (FS) service 145 may include a management server 180. In some embodiments, the management server 180 may receive read and write requests from the client systems 102 and may manage the storing and retrieval of files at the storage resources 170A-C. For example, a file name module 190 may identify specific storage resources to store a file from a client system 102 as well as query storage servers 143A-B in response to a read request from the client system 102. Further details with regard to the file name module 200 are disclosed below.

Figure 2:
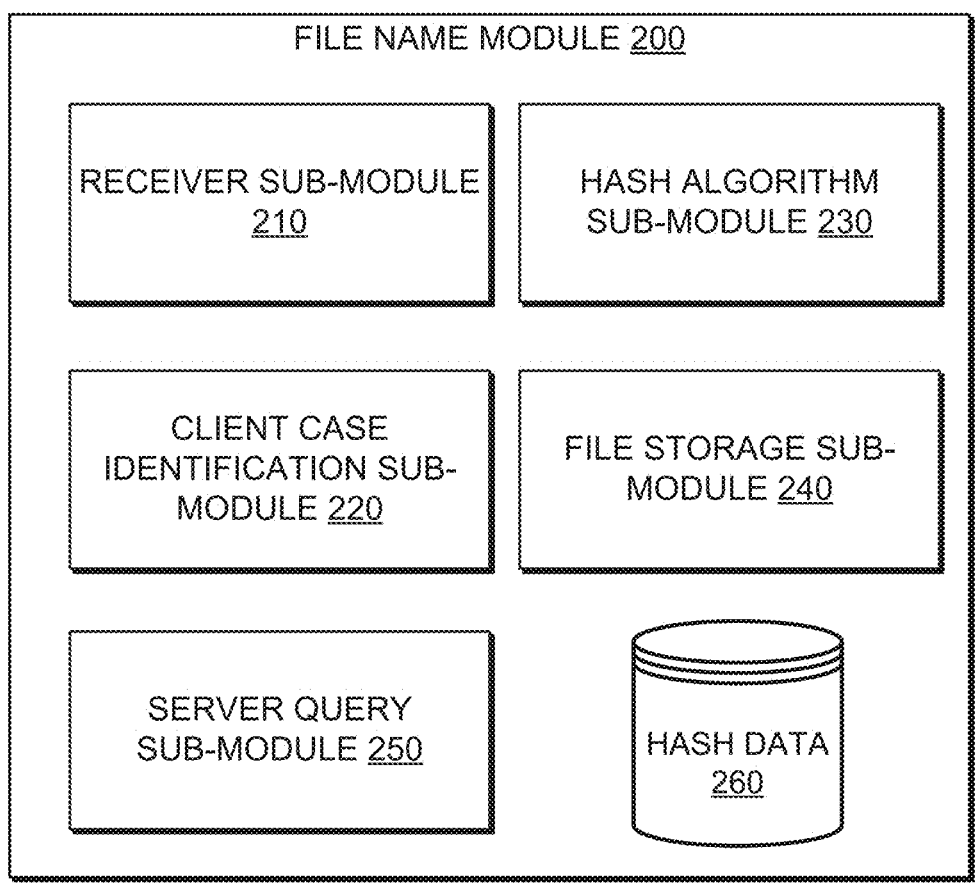
FIG. 2 illustrates an example file name module in accordance with some embodiments of the disclosure.

FIG. 2 is a block diagram of an example file name module 200. In general, the file name module 200 may correspond to the file name module 190 of FIG. 1. The file name module 200 may include a receiver sub-module 210, a client case identification sub-module 220, a hash algorithm sub-module 230, a file storage sub-module 240, and a server query sub-module 250. In alternative embodiments, the functionality of one or more of the sub-modules may be combined or divided.

As shown in FIG. 2, the file name module 200 may include a receiver sub-module 210. In some embodiments, the receiver sub-module 210 may receive a request to store a file. For example, a client system may issue a write request of a file to be stored in a volume of a distributed file system. In some embodiments, the receiver sub-module 210 may also receive read requests from client systems for files stored in a volume of the distributed file system.

The file name module 200 may include a client case identification sub-module 220. In some embodiments, the client case identification sub-module 220 may identify a type of the client system that may intend to write or store the file. For example, a client system may be categorized or identified as a type of client system based on the types of operating systems or file systems of the client systems. Examples of the type of client system may include, but are not limited to, a client system that includes a case sensitive operating system and a client system that includes a case insensitive operating system. As such, client systems with a case sensitive operating system and clients with a case insensitive operating system may access files of a volume.

The service module 200 may include a hash algorithm sub-module 230. In some embodiments, the hash algorithm sub-module 230 may apply a hash algorithm to a file that is to be stored in a volume of a distributed file system. A hash algorithm may map data of arbitrary length to data of a fixed length. In some embodiments, the values returned by the hash algorithm may be referred to as hash values, hash codes, hash sums, checksums, or hashes. In the same or alternative embodiments, the hash algorithm may be applied to file names in order to return a corresponding hash value. Furthermore, the hash algorithm sub-module 230 may apply a first hash algorithm to file names or a second hash algorithm to file names based on the type of client system that has been identified by the client case identification sub-module 220. For example, the first hash algorithm may be applied to file names of files to be written to the volume of the distributed file system if the client system is identified as a case sensitive client system or the second hash algorithm may be applied to file names of files to be written to the volume of the distributed file system if the client system is identified as a case insensitive client system.

Returning to FIG. 2, the file name module 200 may include a file storage sub-module 240. In some embodiments, the file storage sub-module 240 may store a file based on the hash value generated for the file name of the file by the hash algorithm sub-module 230. For example, the distributed file system may include multiple storage resources or storage devices. Each of the storage resources or storage devices may be assigned a hash value range and files may be stored in a particular storage resource or storage device based on the hash value that has been generate for the file name of each file and the hash value range of the storage resources. As such, files may be stored in a storage resource or storage device based on the hash value for a file name. Further details with regard to storing files based on hash values are disclosed with relation to FIGS. 4A and 4B.

The file name module 200 may further include a hash data storage 260. In some embodiments, the hash data storage 260 may include information associating files and file names to hash values. For example, the hash data storage 260 may store the hash value that has been generated for each file corresponding to a file name.

In some embodiments, the file name module 200 may include a server query sub-module 250. In some embodiments, the server query sub-module 250 may query one or more storage servers for a file with a file name. For example, the server query sub-module 250 may receive an indication from the receiver sub-module 210 that a client system has requested to read or retrieve a file stored in a volume of the distributed file system. The server query sub-module 250 may identify the file name of the requested file and use the hash data 260 to identify the hash value that was assigned to the requested file. Furthermore, the server query sub-module 250 may then issue a query to each storage server with a storage resource or storage device that has a hash value range that includes the hash value of the requested file. In some embodiments, the query may be for the storage servers to search a list of file names of a corresponding storage resource to identify if the file name in any case exists in the storage resource.

Figure 3:
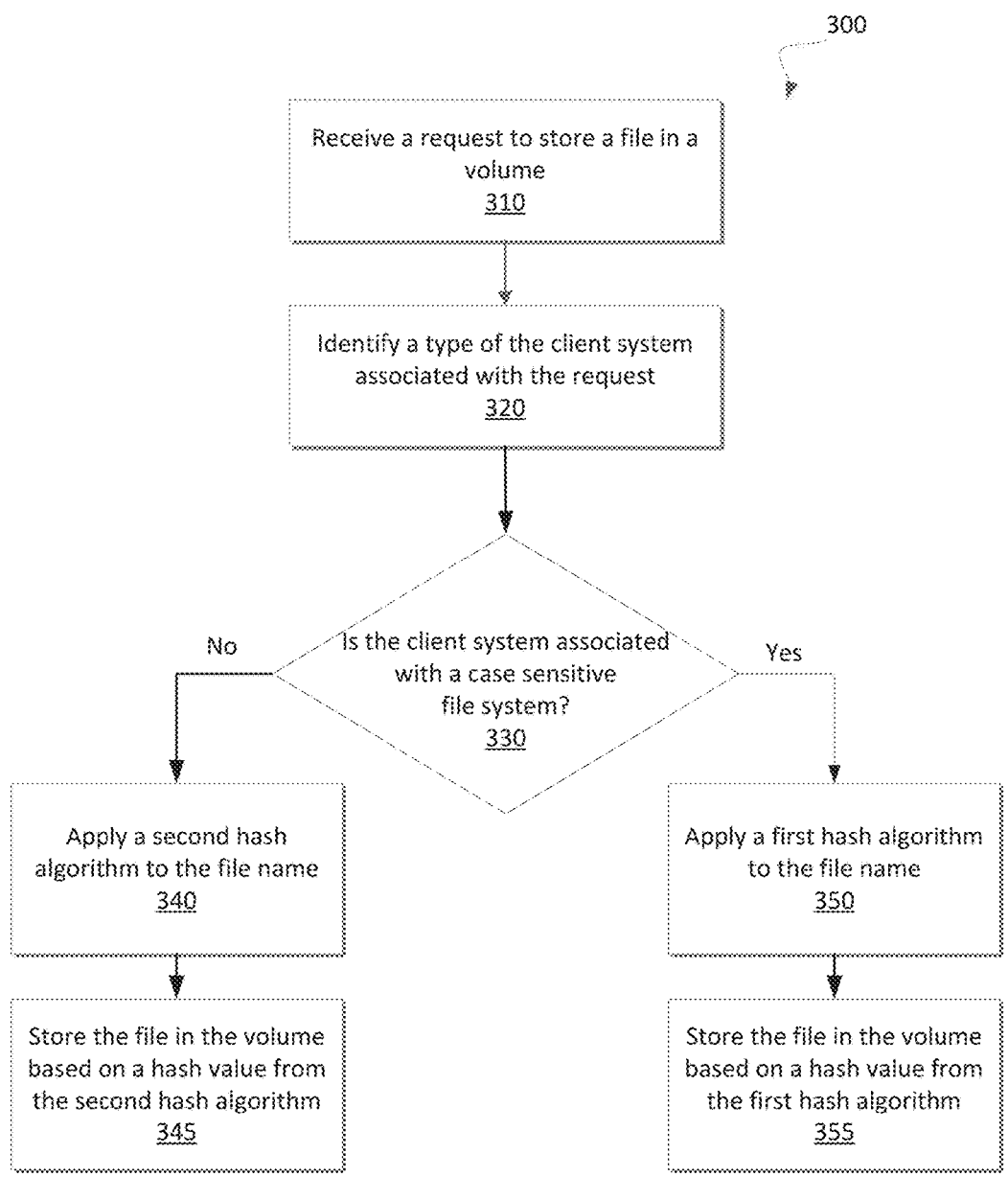
FIG. 3 is a flow diagram of an example method to store a file from a case sensitive client system or a case insensitive client system in accordance with some embodiments.

FIG. 3 is a flow diagram of an example method 300 to store a file from a case sensitive client system or a case insensitive client system. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a file name module 190 or 200 of a management server associated with a distributed file system.

As shown, the method 300 may begin by the processing logic receiving a request to store a file in a volume (block 310). In some embodiments, the processing logic may receive the request from a client system that is writing a file to be stored in a volume of a distributed file system. The processing logic may further identify a type of the client system that intends to store the file (block 320). For example, if the client system includes a case sensitive operating system (e.g., an operating system with a case sensitive file system), then the client system may be identified as a case sensitive client system. Alternatively, if the client system includes a case insensitive operating system (e.g., an operating system with a case insensitive file system), then the client system may be identified as a case insensitive client system. As such, the processing logic may determine if the client system is associated with a case sensitive operating system (block 330). If the client system is identified as a case sensitive client system then a first hash algorithm may be applied to the file (block 350). For example, the first hash algorithm may be applied to the file name of the file to be stored in the volume of the distributed file system to generate a hash value for the file. In some embodiments, the first hash algorithm may be applied to the file name of the file as given or provided by the client system with the case sensitive operating system. Subsequently, the processing logic may store the file in the volume of the distributed file system based on the hash value that has been generated from the first hash algorithm (block 355). For example, the file may be stored at a particular storage server with a storage resource or storage device associated with a hash value range that includes the hash value for the file that has been generated by the first hash algorithm. However, if the processing logic determines that the client system is not associated with a case sensitive operating system and is instead associated with a case insensitive operating system, then the processing logic may apply a second hash algorithm to the file (block 340). For example, the second hash algorithm may be applied to a modified file name of the file to be stored in the volume of the distributed file system to generate a hash value for the file. For example, the file name as provided by the client system may be modified to be case collapsed (e.g., all lower case or all upper case letters) and the second hash algorithm may be applied to the case collapsed file name of the requested file from the client system. The processing logic may then store the file in the volume at a particular storage server with a storage resource or storage device associated with a hash value range that includes the hash value for the file that has been generated by the second hash algorithm (block 345).

As such, a client system may transmit a request to store a file in a volume of a distributed file system. The files of the volume may be stored throughout multiple storage resources or storage devices associated with multiple storage servers. A type of the client system may be identified. In some embodiments, the first type of the client system may be a case insensitive client system and a second type of a client system may be a case sensitive client system. A hash algorithm may be applied to the file name of the file to be stored in the volume. In some embodiments, multiple hash algorithms may be available and a particular hash algorithm may be selected based on the identified type of client system. For example, a first hash algorithm may be used to generate a first hash value of a file based on the file name as given by the client system in the request if the client system is identified as a case sensitive client system type. Alternatively, a second hash algorithm may be used to generate a second hash value for the file based on a modified file name if the client system is identified as a case insensitive client system type. In the same or alternative embodiments, a single hash algorithm may be used to generate the first and second hash values. For example, the same hash algorithm may be used to generate a first hash value based on the file name as given if the client system is identified as a case sensitive client system type and the same hash algorithm may be used to generate a second hash value based on the modified file name if the client system is identified as a case insensitive client system type. Furthermore, the file may be stored in the volume of the distributed file system based on the first or second hash value that has been generated for the file. For example, the hash value generated for the file may be different depending on whether the first hash algorithm was applied to the file (e.g., whether the hash algorithm was applied to the file name as received from the request of the client system) or whether the second hash algorithm was applied to the file (e.g., whether the hash algorithm was applied to a case collapsed version of the file name as received from the request of the client system). The storage server and associated storage resource or storage device selected to store the file may differ depending on whether the first hash value or the second hash value was generated for the file.

FIG. 4A is an illustrated example 400 of storing files in a distributed file system based on a first hash algorithm. In general, the example 400 may illustrate the storing of files in a client system that has been identified as being associated with a case sensitive file system. For example, the example 400 may illustrate the storing of files in a volume of a distributed file system where the volume is accessed by client systems with case sensitive operating systems.

As shown, the table 410 illustrates multiple names for a file that vary in terms of case (e.g., uppercase and lowercase letters) and corresponding hash values for each of the names of the file. The table 410 illustrates three different files with varying case of the name 'file' and the corresponding hash values for each of the names with the varying case. For example, the file with the file name of 'File' may have a generated hash value of 349, the file with the file name 'file' may have a generated hash value of 473, and the file with the file name 'FILE' may have a generated hash value of 900. As such, the hash value generated by the first algorithm for each of the names may be different because the names have different combinations of uppercase and lowercase letters. Thus, the first hash algorithm may apply a hash algorithm to the file name as received in a request to store the file by a client system with a case sensitive operating system.

Furthermore, the example 400 illustrates server storage 420, 430, and 440. In some embodiments, each of the server storage 420, 430, and 440 may correspond to a storage resource or storage device (e.g., 170A-C). Furthermore, each server storage 420, 430, and 440 may be associated with a range of hash values. For example, the server storage 440 may store files with a generated hash value in a first hash value range between 0 and 333, the server storage 430 may store files with a generated hash value in a second hash value range between 334 to 665, and the server storage 420 may store files with a generated hash value in a third hash value range between 666 to 1000. As such, each server storage may be associated with a different hash value range that may be used to determine which server storage a file may be stored. For example, the file with a file name of 'File' and the generated hash value of 349 and the file with a file name of 'file' and the generated hash value of 473 may be stored in the server storage 430 with the hash value range between 334 to 665. Furthermore, the file with the file name of 'FILE' and the generated hash value of 900 may be stored in the server storage 420 with the hash value range between 666 to 1000.

FIG. 4B is an illustrated example 450 of storing files in a distributed file system based on a second hash algorithm. In general, the example 450 may illustrate the storing of files by a client system that has been identified as being associated with a case insensitive file system. For example, the example 400 may illustrate the storing of files in a volume of a distributed file system where the volume is accessed by client systems with case insensitive operating systems.

As shown in FIG. 4B, the table 460 illustrates files with file names that are identical to those in table 410 of FIG. 4A, but the generated hash values may differ. For example, the hash values of the file names may not change based on a different combination of uppercase and lowercase letters as received in a request to write the files from the client system. For example, the file with a file name of 'File' may have the identical or same hash value as the file with the file name of 'file' or the file with the file name of 'FILE.' As such, the second hash algorithm may generate the same hash value for files names that are identical in name despite any difference or change in uppercase and lowercase letters as received from the request of the client system. In some embodiments, the second hash algorithm may generate a hash value after modifying or converting the file name received from the client system with a case insensitive operating system to a case collapsed (e.g., all uppercase letters or all lowercase letters). For example, the file name of 'FiLe' may be case collapsed to 'file' and/or 'FILE.'

Returning to FIG. 4B, the generated hash value for each of the file names that have a different combination of uppercase and lowercase letters as received from a client system may be the same after the file names have been modified to a case collapsed version of the file name. In the example 450, the generated hash value for all three files is 900. Since the generated hash value for all three files is identical, all three of the files may be stored in the same server storage 420 that includes the hash value range of 666 to 1000.

Figure 5:
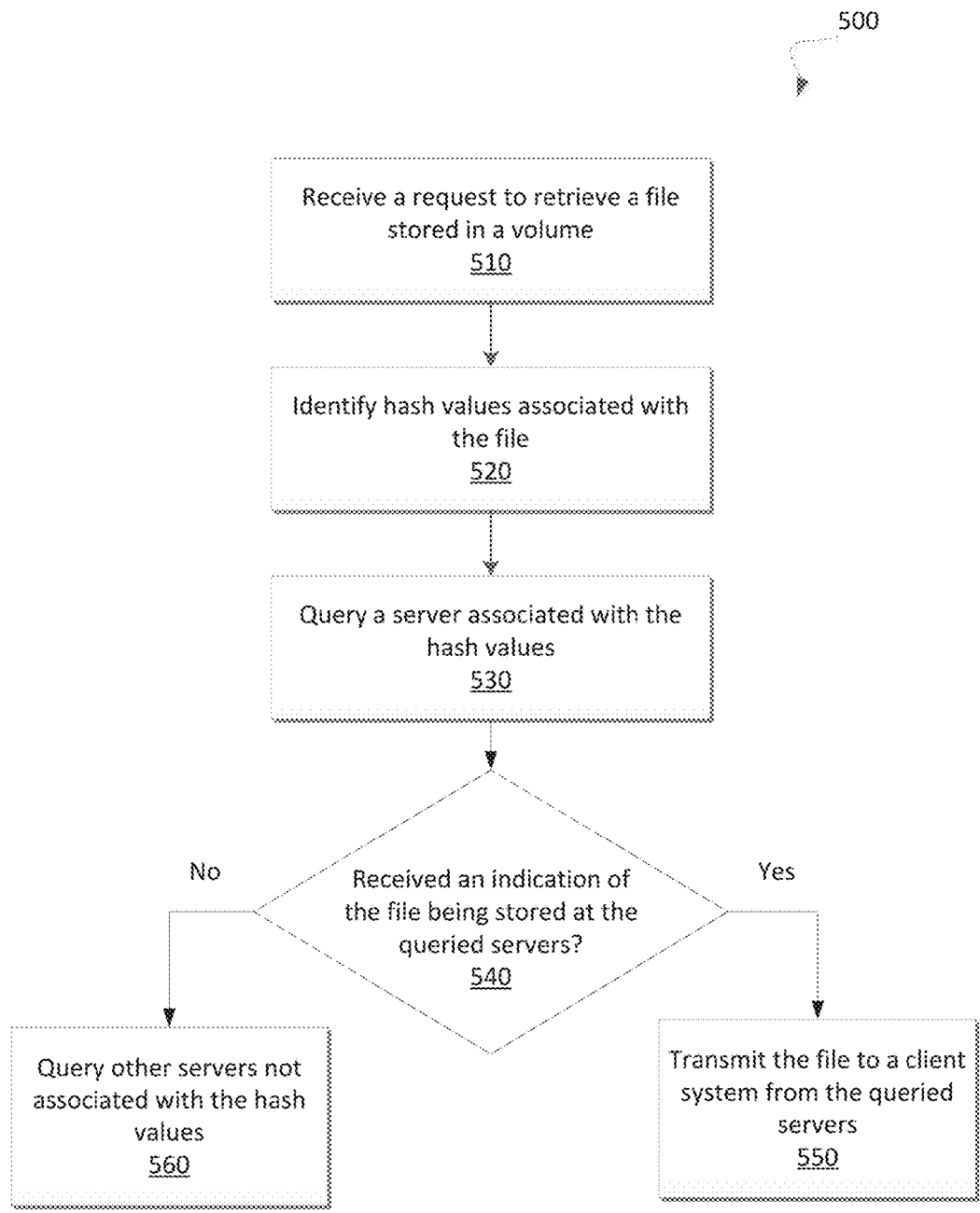
FIG. 5 is a flow diagram of an example method to retrieve a file stored in a volume for a case insensitive client system in accordance with some embodiments.

FIG. 5 is a flow diagram of an example method 500 to retrieve a file for a case insensitive client system. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a file name module 190 or 200 of a management server associated with a distributed file system.

The method 500 may begin with the processing logic receiving a request to retrieve or read a file stored in a volume (block 510). For example, client system may transmit a read request for a file stored in a volume of the distributed file system. The processing logic may identify hash values associated with the requested file (block 520). For example, the processing logic may access hash information (e.g., hash data 260) that identifies hash values for previously stored files. In the same or alternative embodiments, the processing logic may calculate multiple hash values for the file name of the requested file. For example, a first hash value for the file name as requested by the client system may be generated. Furthermore, a second hash value for a first case collapsed file name of the requested file may be generated (e.g., all uppercase letters) and a third hash value for a second case collapsed file name of the requested file may also be generated (e.g., all lowercase letters). The processing logic may query a storage server associated with the assigned hash values (block 530). For example, the processing logic may identify storage servers and associated server storage that have been assigned a range of hash values that includes any of the hash values that have been identified or calculated for the requested file. In some embodiments, a subset of the storage servers of the distributed file system may be assigned the range of hash values that includes the hash values that have been calculated for the requested file. For example, a first set of storage servers may be assigned a range of hash values that includes one or more of the hash values of the requested file and a second set of storage servers of the distributed file system may be assigned a range of hash values that does not include the hash values of the requested file. As such, the processing logic may not query every storage server of the distributed file system, but only storage servers that have been assigned a particular range of hash values. In some embodiments, the query to each of the servers associated with the hash values may be a request for each of the storage servers to determine whether a file with all uppercase or all lowercase letters of the file name or the original file name as in the request is stored at the server. The processing logic may receive an indication of the file being stored at a queried server (block 540). If the processing logic receives an indication of the file being stored at any of the queried servers then the processing logic may transmit a file to the client system (block 550) from one of the queried servers with a hash value range that includes one or more of the hash values of the requested file. For example, the first file that is returned by any of the storage servers may be transmitted to the client system. However, if no indication is received of the file being stored at the queried server, then the processing logic may issue a new query to all other servers of the distributed file system that were not previously queried. For example, servers with a hash value range that do not include the hash values of the requested file may be queried for the file.

In some embodiments, multiple positive indications of the file's presence may be received from multiple servers. In such a situation, a priority algorithm may be used to choose among the multiple files from the multiple servers.

FIG. 6 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a file name module (e.g., file name module 190 of FIG. 1 and/or file name module 200 of FIG. 2) and/or a software library containing methods that call modules or sub-modules in a file name module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

receiving a request from a client system to store a file in a volume associated with a plurality of storage servers;

identifying a type of the client system in view of a type of file system associated with the client system, the client system being identified as a case sensitive client system when the file system is case sensitive and the client system being identified as a case insensitive client system when the file system is case insensitive;

selecting a first hash function or a second hash function by using the identification of the type of file system associated with the client system requesting to store the file;

calculating, by a processing device, for a name of the file, a first hash value by selecting the first hash function when the client system is identified as the case sensitive client system and a second hash value by selecting the second hash function when the client system is identified as the case insensitive client system;

storing the file at a first storage server of the plurality of storage servers in view of the first hash value when the client system is identified as the case sensitive client system or at a second storage server of the plurality of storage servers in view of the second hash value when the client system is identified as the case insensitive client system;

receiving a request to retrieve the stored file in the volume associated with the plurality of storage servers;

in response to receiving the request to retrieve the stored file, calculate a plurality of hash values for the name of the file by using the first hash function with a modified name of the file and the second hash function with the name of the file;

querying the plurality of storage servers associated with the volume for the stored file in view of the plurality of hash values, wherein different hash values are provided to different storage servers to query the plurality of storage servers for the stored file;

in response to the query, receiving from each of two or more storage servers of the plurality of storage servers a positive indication that the file is stored on each of the two or more storage servers;

using a priority function to select the file from a first storage server of the two or more storage servers; and transmitting, to the client device, the file from the first storage server in view of the priority function.

2. The method of claim 1, wherein the first storage server is associated with a first hash value range and the second storage server is associated with a second hash value range, and the first hash value is within the first hash value range and the second hash value is within the second hash value range.

3. The method of claim 1, wherein the first hash value and the second hash value are calculated in view of a same hash algorithm.

4. The method of claim 1, further comprising:

receiving a request for a second file stored in the distributed file system;

identifying an assigned hash value associated with the second file; and querying a server of the plurality of storage servers, the server being associated with a storage resource that is associated with a hash value range that comprises the assigned hash value.

5. The method of claim 4, wherein the querying of the server results in an indication of whether the storage resource comprises the requested file.

6. The method of claim 1, wherein the modified name of the file corresponds to a change in case of a letter of the name of the file from uppercase to lowercase or from lowercase to uppercase.

7. The method of claim 1, wherein querying the plurality of storage servers associated with the volume for the stored file in view of the plurality of hash values comprises:

providing a query to each of the plurality of storage servers that is assigned a hash value range that comprises any of the plurality of hash values, the query indicating, for each of the plurality of servers, to search a list of file names in a plurality of cases at a respective storage server.

8. The method of claim 1, wherein the calculated plurality of hash values comprises a first hash value that is calculated by using the name of the file from the request, a second hash value for the name of the file with each case of a letter of the name being uppercase, and a third hash value for the name of the file with each case of a letter of the name being lowercase.

9. A system, comprising:

a memory; and a processing device, operatively coupled with the memory, to:

receive a request from a client system to store a file in a volume associated with a plurality of storage servers;

identify a type of the client system in view of a type of file system associated with the client system, the client system being identified as a case sensitive client system when the file system is case sensitive and the client system being identified as a case insensitive client system when the file system is case insensitive;

select a first hash function or a second hash function by using the identification of the type of file system associated with the client system requesting to store the file;

calculate, for a name of the file, a first hash value by selecting the first hash function when the client system is identified as the case sensitive client system and a second hash value by selecting the second hash function when the client system is identified as the case insensitive client system;

store the file at a first storage server of the plurality of storage servers in view of the first hash value when the client system is identified as the case sensitive client system or at a second storage server of the plurality of storage servers in view of the second hash value when the client system is identified as the case insensitive client system;

receive a request to retrieve the stored file in the volume associated with the plurality of storage servers;

in response to receiving the request to retrieve the stored file, calculate a plurality of hash values for the name of the file by using the first hash function with a modified name of the file and the second hash function with the name of the file;

query the plurality of storage servers associated with the volume for the stored file in view of the plurality of hash values, wherein different hash values are provided to different storage servers to query the plurality of storage servers for the stored file;

in response to the query, receive from each of two or more storage servers of the plurality of storage servers a positive indication that the file is stored on each of the two or more storage servers;

use a priority function to select the file from a first storage server of the two or more storage servers; and transmit, to the client device, the file from the first storage server in view of the priority function.

10. The system of claim 9, wherein the first storage server is associated with a first hash value range and the second storage server is associated with a second hash value range, and the first hash value is within the first hash value range and the second hash value is within the second hash value range.

11. The system of claim 9, wherein the first hash value and the second hash value are calculated in view of a same hash algorithm.

12. The system of claim 9, the processing device is further to:

receive a request for a second file stored in the distributed file system;

identify an assigned hash value associated with the second file; and query a server of the plurality of storage servers, the server being associated with a storage resource that is associated with a hash value range that comprises the assigned hash value.

13. The system of claim 12, wherein the querying of the server results in an indication of whether the storage resource comprises the requested file.

14. A non-transitory machine-readable storage medium comprising data that, when accessed by a processing device, cause the processing device to:

receive a request from a client system to store a file;

identify a type of the client system in view of a type of file system associated with the client system, the client system being identified as a case sensitive client system when the file system is case sensitive and the client system being identified as a case insensitive client system when the file system is case insensitive;

select, by the processing device, a first hash function or a second hash function by using the identification of the type of file system associated with the client system requesting to store the file;

calculate, for a name of the file, a first hash value by selecting the first hash function when the client system is identified as the case sensitive client system and a second hash value by selecting the second hash function when the client system is identified as the case insensitive client system;

store the file at a first storage server of the plurality of storage servers in view of the first hash value when the client system is identified as the case sensitive client system or at a second storage server of the plurality of storage servers in view of the second hash value when the client system is identified as the case insensitive client system;

receive a request to retrieve the stored file in the volume associated with the plurality of storage servers;

in response to receiving the request to retrieve the stored file, calculate a plurality of hash values for the name of the file by using the first hash function with a modified name of the file and the second hash function with the name of the file;

query the plurality of storage servers associated with the volume for the stored file in view of the plurality of hash values, wherein different hash values are provided to different storage servers to query the plurality of storage servers for the stored file;

in response to the query, receive from each of two or more storage servers of the plurality of storage servers a positive indication that the file is stored on each of the two or more storage servers;

use a priority function to select the file from a first storage server of the two or more storage servers; and transmit, to the client device, the file from the first storage server in view of the priority function.

15. The non-transitory machine-readable storage medium of claim 14, wherein the first storage server is associated with a first hash value range and the second storage server is associated with a second hash value range, and the first hash value is within the first hash value range and the second hash value is within the second hash value range.

16. The non-transitory machine-readable storage medium of claim 14, wherein the first hash value and the second hash value are calculated in view of a same hash algorithm.

17. The non-transitory machine-readable storage medium of claim 14, wherein the processing device is further to:

receive a request for a second file stored in the distributed file system;

identify an assigned hash value associated with the second file; and query a server of the plurality of storage servers, the server being associated with a storage resource that is associated with a hash value range that comprises the assigned hash value.

* * * * *